United States Patent [19]
Potts

[11] Patent Number: 6,059,206
[45] Date of Patent: May 9, 2000

[54] APPARATUS AND PROCESS FOR SEPARATING MATERIALS FROM LAMPS

[75] Inventor: Richard A. Potts, East Bethel, Minn.

[73] Assignee: Mercury Waste Solutions, Inc., St. Paul, Minn.

[21] Appl. No.: 08/771,966

[22] Filed: Dec. 23, 1996

[51] Int. Cl.[7] .................. B02C 19/12; B02C 23/08
[52] U.S. Cl. .............. 241/24.12; 241/24.15; 241/24.22; 241/29; 241/79.1; 241/99; 241/DIG. 38
[58] Field of Search ................. 241/24.12, 29, 241/79.1, 99, 100, 152.2, DIG. 38, 24.15, 24.22

[56] References Cited

U.S. PATENT DOCUMENTS

| | | | |
|---|---|---|---|
| 5,388,773 | 2/1995 | Perry | 241/19 |
| 5,395,056 | 3/1995 | Perry | 241/19 |
| 5,492,278 | 2/1996 | Raboin | 241/57 |
| 5,586,730 | 12/1996 | Mortrud | 241/24.22 |
| 5,683,041 | 11/1997 | Sewill et al. | 241/19 |

Primary Examiner—John M. Husar
Attorney, Agent, or Firm—Schwegman, Lundberg, Woessner & Kluth, P.A.

[57] ABSTRACT

The present invention relates to a process and apparatus for the separation of materials from within fluorescent lamps and other mercury containing commercial elements. The process and apparatus can separate materials of different compositions by non-chemical means into easily treatable segments without causing significant introduction of wastes (especially mercury waste) into the environment during physical separation. This invention operates by repeatedly crushing and breaking the original article (e.g., the fluorescent lamp) into progressively smaller pieces under controlled circumstances and controlled air pressure so that their various component materials are separately collected and these separately collected components may be individually processed (recycled or purified) without significant introduction of mercury into the environment. The location of venting means and negative air pressure draw path proximally away from the final position of material flow by itself can significantly increase recovery of mercury in the waste stream.

33 Claims, 4 Drawing Sheets

APPARATUS AND PROCESS FOR SEPARATING MATERIALS FROM LAMPS

BACKGROUND OF THE INVENTION

1. Field of the Invention

The present invention relates to apparatus and processes for separating lamps (e.g., fluorescent lamps and bulbs, as well as other breakable materials) into component materials or groups of materials based upon essentially only physical processing of materials. The invention is more particularly related to the crushing and separation of materials in incandescent lamps, particularly those having fluorescent capability with phosphors and mercury within the lamp. The materials separated by the process often include phosphor powder (e.g., calcium phosphate), glass, plastic and metal (e.g., endcaps and wires).

2. Background of the Art

One of the many serious forms of pollution which has been created by industry has been the levels of mercury introduced into the environment from manufactured goods. Amongst the more prominent incidents involving mercury were the Minnimata contamination in Japan and the swordfish warnings in the 1950's. At Minnimata, mercury waste from a local manufacturing company contaminated a bay and many local residents ingested high levels of mercury from fish. The effects of mercury, like those of many heavy metals, are quite devastating, prolonged, and difficult to treat. Mercury is particularly dangerous because, even though it is a liquid and its boiling point is about 675° F. (356.6° C.), it is hygroscopic and enters the surrounding air and water system quickly. It is also injurious in small doses which can be rapidly ingested from breathing contaminated air.

Even with its serious potential for harm, mercury has many significant commercial uses and is widely accepted in the electrical and electronics area as a conductor. Mercury is conventionally used, for example, as a component in batteries, as a contact for electrical switches, as circuit connectors and switches in thermostats, and as conductors in fluorescent lamps. The presence of mercury in fluorescent lamps is a particularly serious concern because of the volume of lamps used and the ease of sending those lamps directly to landfills from residential and commercial use. Because of the large volume of use for mercury, there is also a large volume of mercury waste which is created each year. Mercury should no longer be deposited in solid waste landfills because of its known hazardous effects on the environment, and burying it is merely a temporary and unsafe disposal method since mercury will readily enter the water table and spread in the environment, even if ingested by bacteria, insects or the like.

It is important that methods, apparatus and procedures be established which can reduce the amount of mercury which enters the environment as a result of discarding of used or broken fluorescent lamps. One of the first steps involved in this process is the physical separation of components of finished articles into separate waste streams which can be individually processed in chemically specific methodology.

SUMMARY OF THE INVENTION

The present invention relates to a process and apparatus for the separation of materials from within fluorescent lamps and other mercury containing commercial elements. The process and apparatus can separate materials of different compositions by non-chemical means into easily treatable segments without causing significant introduction of wastes (especially mercury waste) into the environment during physical separation. This invention operates by repeatedly crushing and breaking the original article (e.g., the fluorescent lamp) into progressively smaller pieces under controlled circumstances and controlled air pressure so that their various component materials are separately collected and these separately collected components may be individually processed (recycled or purified) without significant introduction of mercury into the environment.

DETAILED DESCRIPTION OF THE INVENTION

The removal of mercury from solid materials is an important aspect of providing a non-toxic environment. Mercury is both highly toxic, aerobically and organically ingestible, and persistent within an animal's body.

One of the significant volume sources of mercury waste derives from its use in fluorescent lamps or bulbs, particularly where the mercury is present on the calcium phosphate or other metallic materials within the lamp. These lamps are often generally combined into commercial or household waste streams and treated identically with other solid waste material to be deported in solid landfill facilities. The lamps are almost certain to be broken during transportation and/or burial, and the mercury is then allowed to enter the general environment during transport or deposition in a landfill. This is nearly a guaranteed method of introducing mercury into the environment and the local ecosystem.

Attempts have recently been made to treat lamps as a unique solid waste from which recyclable materials can be retrieved and hazardous wastes removed before actual, less harmful, waste needs to be land filled. One of these attempts includes a crusher system which breaks the lamps down into its component parts (e.g., end caps, wires, phosphate powders (containing both absorbed adsorbed or amalgam of mercury), glass, and polymeric or rubber components. A prior art system which has been used commercially is segmentally shown in FIGS. 2a, 3a, 4a and 5a. Although this system has achieved a degree of commercial acceptance and success, the present invention describes improvements and modifications to that prior art system which can reduce mercury release into the final waste stream by 30%, probably at least 40% and possibly as high as 80% over the prior art system. In view of the fact that the original system was intended to decrease mercury release, and that the present system enables such a significant level of improvement is dramatic evidence of the improvement of the present invention over the commercial system. The significant individual features which may be individually used or combined in a total system will be described with respect to the prior art system.

Figure 1:
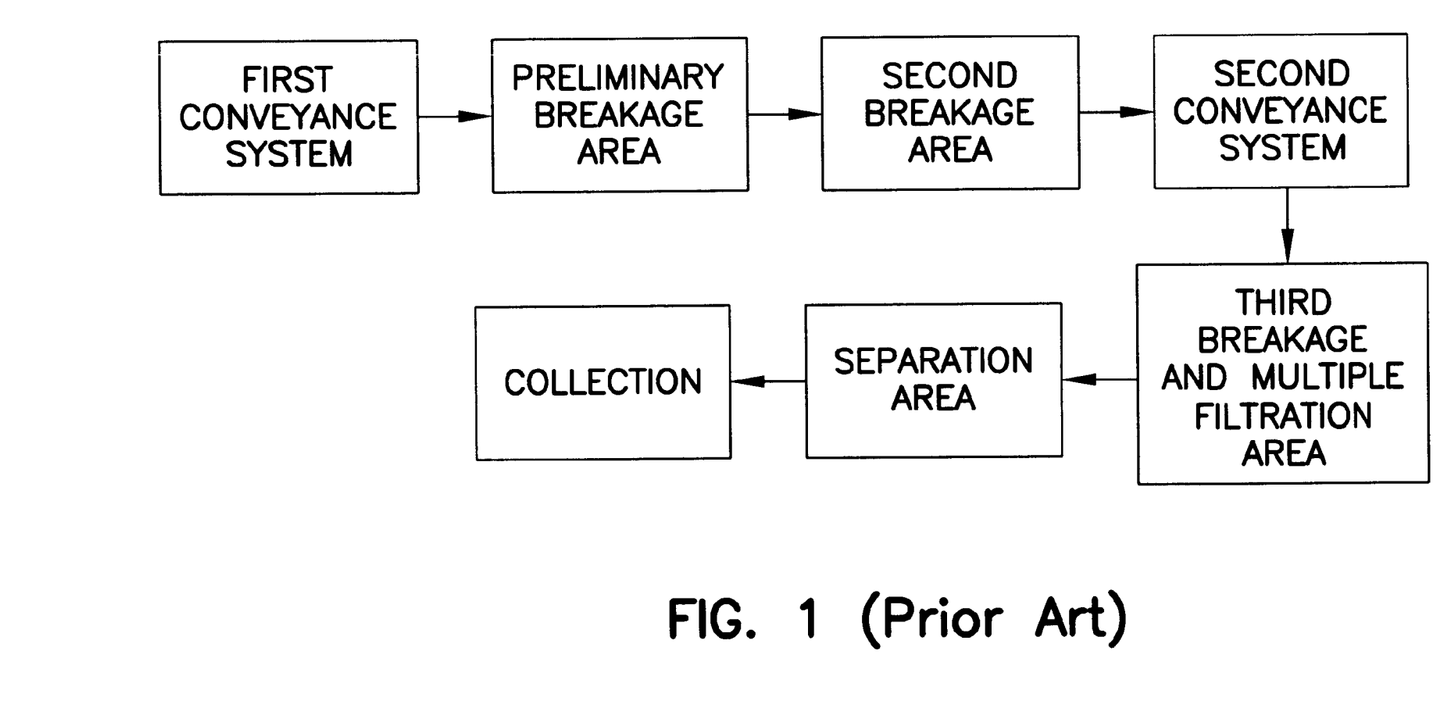
FIG. 1 is a flow diagram generally describing the basic process performed by the prior art and the present invention.

FIG. 1 is a flow diagram representation of the basic process performed by the prior art and the present invention. A conveyance system (conveyor belts on roller shown to be two separate conveying elements) carries lamps (unbroken, damaged and/or broken) to a preliminary breaking area where the size of the lamps is diminished by breaking means. A second breaking area further decreases the size of the material from the lamp, usually to an intermediate waste product of broken piece, which has at least one dimension of an inch or less. After the second breaking area, the broken pieces are carried into another area where further breakage and movement of the pieces occurs so that the pieces may be separated according to their relative size (which is in part due to the nature of the materials). The pieces continue through a separation area and are then collected into their groups of materials which generally comprise metals (from end caps and wires), glass, and phosphates (usually with mercury absorbed therein or adsorbed thereon). Plastic or rubber, if present, will usually be associated with the metal or glass residue, depending upon events which occur in the process. The figures will show the significant improvements in the apparatus in a sequence of areas along the process streams.

In general terms, the apparatus of the invention would be likely to at least comprise an apparatus for separating materials from breakable elements, particularly fluorescent lamps, said apparatus comprising at least one means for conveying solid material (e.g., said means being any carrying mechanism, such as a conveyor belt, a vacuum lift, vibrating belt, screw augur, or any other mechanism which can physically transport lamps) to a first size reducing means which applies force to said breakable elements sufficient to break said breakable elements (said first breaking means being any system which applies force as by crushing, beating, agitating, striking impacting or the like) and form a first portion. After said first size reducing means, there is a second size reducing means for applying force to said first portion(s) of said breakable elements which have been broken, said second size reducing means (e.g., a crushing device which provides forces to the already broken material, such as nip rollers or platen crushing means) being capable of reducing the size of at least some of said first portions of said breakable elements which have already been broken into a second portion. A second conveying means is located so as to receive at least some of said second portion(s) of breakable material which have been broken after at least some of said first portion(s) have had their size reduced by said second size reducing means. Said second conveying means conveys said second portion to a third size reducing means, said third size reducing means comprising at least two (preferably rotating) mass conduction connected filter elements having interior and exterior surfaces, a first of said at least two filter elements having open areas which pass from its interior to its exterior surface which are smaller than open areas which pass from the interior to the exterior surface of said second filter element. There is a frame which covers at least said first, second and third size reducing means, and a pump which withdraws gas (e.g., air) from within said frame through a vent, said at least two filter elements defining a longitudinal dimension which comprises the combined length from a first end of said first filter where said second portions are introduced into said third size reducing means to a second end where a third portion comprising material which has not passed through openings from said interior surface to said exterior surface in either said first and second filter element exits said second filter element. One alternative improvement in the construction of the apparatus of the present invention is to have said vent with its center at least one eighth of the distance from said first end to said second end, away from said second end towards said first end.

The invention may be alternatively described as an apparatus for separating materials from lamps comprising a means for conveying a fluorecent lamp to a first size reducing means which applies force to said lamps sufficient to break said lamps to form a first portion, after said first size reducing means there is a second size reducing means for applying force to said first portions of said lamps which have been broken, said second size reducing means being capable of reducing the size of at least some of said first portion to create a second portion(s), and a second conveying means which is located to receive at least some of said second portion of said lamps which have been broken after at least some of said first portions have had their size reduced by said second size reducing means, said second conveying means conveying said second portion to a third size reducing means, said third size reducing means comprising at least two mass conduction connected filter elements (preferably rotating elements) having interior and exterior surfaces. A first of said at least two mass conducting filter elements has open areas which pass from its interior to its exterior surface which are smaller than open areas which pass from the interior to the exterior surface of said second mass conducting filter element, a frame which covers at least said first, second and third size reducing means, and a means which causes gas from within said frame to be withdrawn through a vent. The at least two mass conducting filter elements define a longitudinal dimension which comprises a length from a first end of said first mass conducting filter where said second portions are introduced into said third size reducing means to a second end where a third portion(s) comprising material which has not passed through openings from said interior surface to said exterior surface in either said first and second mass conducting filter element exits said second mass conducting filter element (usually by being pushed or falling, or otherwise directed to move out of an open end of said second mass conducting filter element), said vent having its center at least one eighth of the distance from said first end to said second end, away from said second end towards said first end. The means for conveying a fluorescent lamp to a first size reducing means generally comprises two distinct conveying means with a gap between them, and within said gap is a solid element which at least partially descreases the open area within said gap. The apparatus is preferably designed so that a portion of a first of said two distinct conveying means is located outside of said frame so that manual contact with said first of said two distinct conveying means may be made. This allows workers to place lamps onto a first section of the first conveying means from outside the frame. The preferred first size reducing means comprises an element which strikes said lamps. This may simply be a beater-type bar, egg-beater-type configuration, rotating chains, etc. The preferred said second size reducing means comprises a means which crushes or grinds said first portion. The preferred said second size reducing means comprises a pair of rollers (e.g., nip rollers, with smooth, textured or bristled surfaces) which apply force to said first portion. As shown in FIG. 4b, the pair of rollers 32 and 34 are preferably metal and are located with a space between said rollers 32 and 34 and a delivery end of said first conveying means 4b, and a guiding element 50 extends from below said rollers 32 and 34 to a location behind an end of said first conveying means so that any material 38 which may fall vertically from said first conveying means 4b will land on said guiding surface 50 and be guided to said second conveying means 54, the guiding means 50 being set away from said first conveying means 4b so that individual elements or pieces of said second portion do not become lodged within the space by which the guiding means 50 is set away from said first conveying means 4b. Preferably, between said first and said second mass conducting filter elements 72 and 74 there is a continuous lip 100 around the interior of and end of said first mass conducting filter element 72 between said first mass conducting filter element 72 and said said second mass conducting filter element 74 to prevent backwash or movement twoards the proximal end of the two filter elements. The apparatus most preferably has at least three separate collection means 86, 88, 90 within said third size reduction area(s) 72b, a first collection means 86 associated with said first mass conducting filter element 72 which collects particulate material(not shown), the majority of which is particulates associated with mercury, a second collection means 88 associated with said second mass conducting filter element 74 which collects particulates (not shown), the majority of which comprises glass, and a third collection means 90 after said at least two mass conducting filter elements 72 and 74 which collects material comprising a majority of material which was too large to pass from the interior to exterior surfaces of said at least two mass conducting filter elements 72 and 74. The apparatus preferably has said third collecting means collects materials comprising metal from said lamps.

Figure 2A:
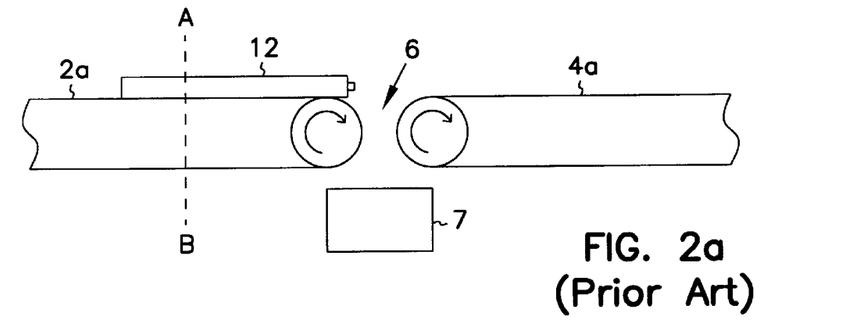
FIG. 2a shows the intersection of the first conveyance means 6 with the second conveyance means b in the prior art.

FIG. 2a shows the first conveying means 2a and second conveying means 4a in the apparatus of the prior art. The preferred conveying means is a conveyor (belt) 4a. The lamps 12 are normally laid manually on the first conveying means 2a parallel to the direction of travel conveyor 2a so that the lamps easily bridge the gap 6 between conveyors 2a and 4a. However, some breakage may already exist, and a collection box 7 has been used to collect materials which fall through the gap 6. The amount of breakage waste can be significant, and conventional storing of the breakage in an open box increases the risk of mercury vapor being able to evaporate into the air.

Figure 2B:
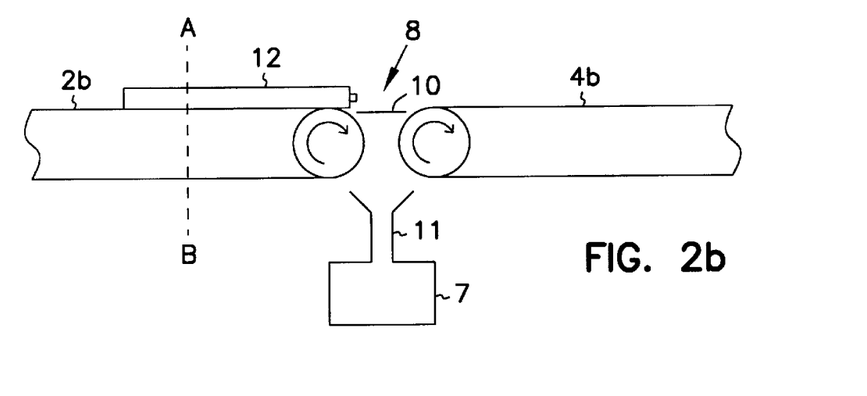
FIG. 2b shows the intersection of the first conveyance means 6 with the second conveyance means b in the prior art in one option of the present invention.

In FIG. 2b, the gap 8 between a first conveyor 2b and second conveyor 4b is partially covered by a plate or closure 10 which reduces the effective size of the gap 8 so that only fine pieces may pass through any open areas between the plate 10 and the conveyors 2b and 4b. Brushes or seals (not shown) may extend from the plate 10 to each of the conveyors 2b and 4b to further close the access of the gap 10. Any particles (not shown) which still manage to pass by the plate 10 can be captured in a funneling means 11 which will transfer the pieces to a capture container 13. Because the pieces are smaller and a funneling device may be used, the capture box 13 more easily may be designed to further reduce the escape of mercury vapor from the container 13. An enclosing means, such as a frame or container (not shown) may be provided before, at or after the gap 6 or 8 between the conveyors 2a and 4a and 2b and 4b respectively, such as beginning along line A-B. The enclosing means may be a frame or box which will allow pressure (air pressure, e.g., negative air pressure) to be applied over the majority of the remainder of the apparatus and process to assist the prevention of mercury vapor or dust leakage into the environment.

Figure 3A:
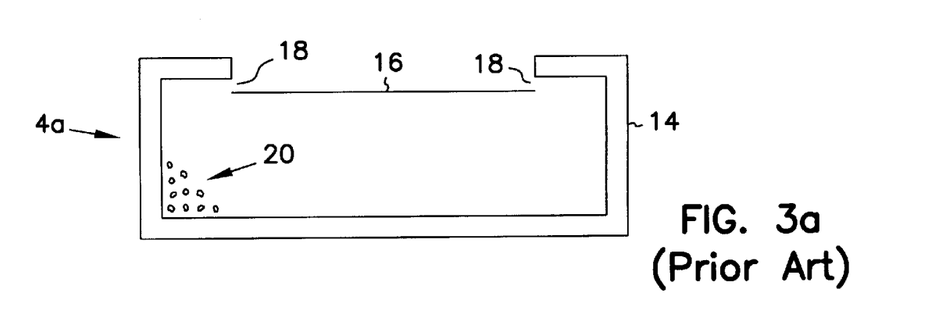
FIG. 3a shows a cross section of the second conveying means 4a of the prior art.
Figure 3B:
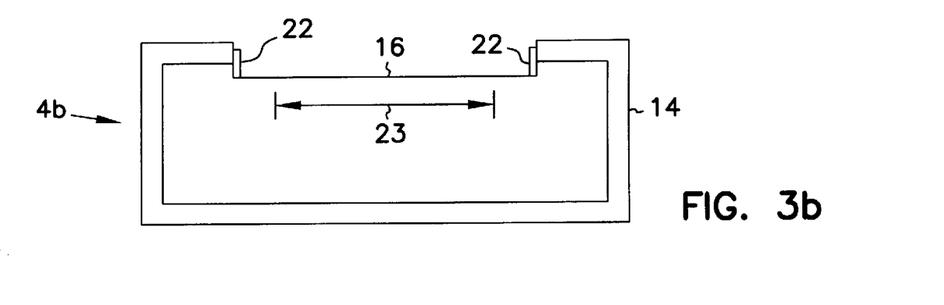
FIG. 3b shows a cross section of a second conveying means 4b useful in the practice of the present invention.

Another helpful feature in the second conveying means 4b is shown in a comparison between FIGS. 3a and 3b. In FIG. 3a, the conveying surface 16 has at least one gap 18 between the frame 14 and the conveying surfaces. It is therefore easy for particles 20 to pass through such a gap 18 and collect within the dead air space of the frame. Such particles 20 can readily collect into a significant volume that can interfere with movements of the conveyor surface 16 and require shutdown of the entire system to enable cleaning out of particles 20 which have collected inside the frame 14. These particles 20 are also a source of mercury vapor which can build up in the frame 14. Although the air flow equipment is intended to be run 24 hours a day, the negative pressure operating over the system may be shut down at intervals, and in these intervals mercury vapor pressure can build up within the system over these particles 20. Therefore these particles 20 must sometimes be removed from the system, or mercury vapor release could be quite likely during these inactive periods.

FIG. 3b shows the placement of brushes 22 which prevent passage of particles (20 not shown) through the gap 18. These brushes may be metallic, polymeric, natural or composition materials and should be selected or treated to minimize wear on the conveying surface 16. The brushes 22 may be angled, aligned or shaped so that movement of the conveyor surface 16 which causes pieces (not shown) to impart the filaments of the brushes 22 shall cause a substantial portion of the pieces to be deflected towards a more central area 23 of the conveyor surface 16.

Figure 4A:
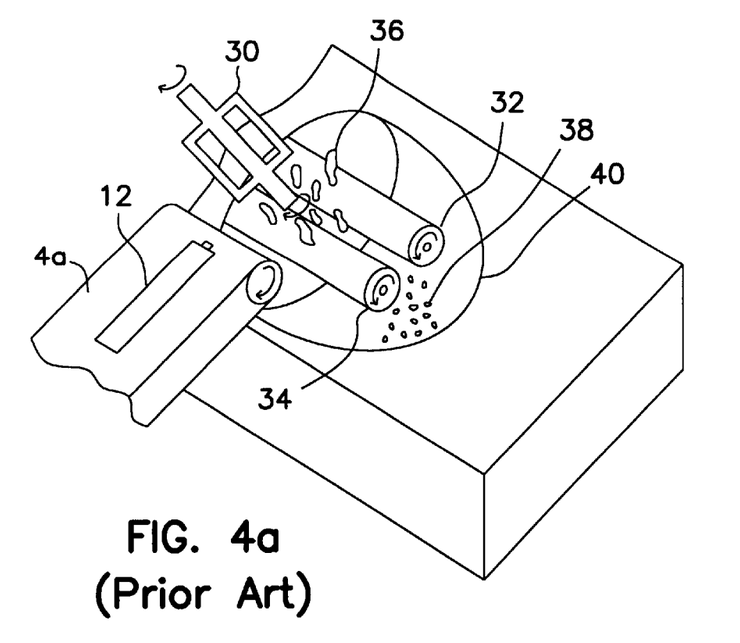
FIG. 4a shows the first and second crushing or breakage zone in the prior art constructions.
Figure 4B:
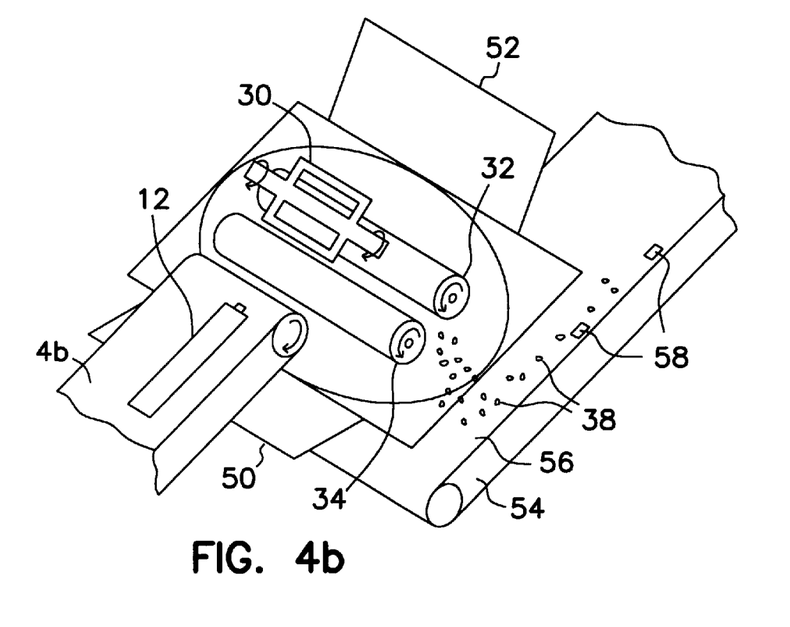
FIG. 4b shows a first and second crushing or breakage zone in a construction of the present invention.
Figure 5A:
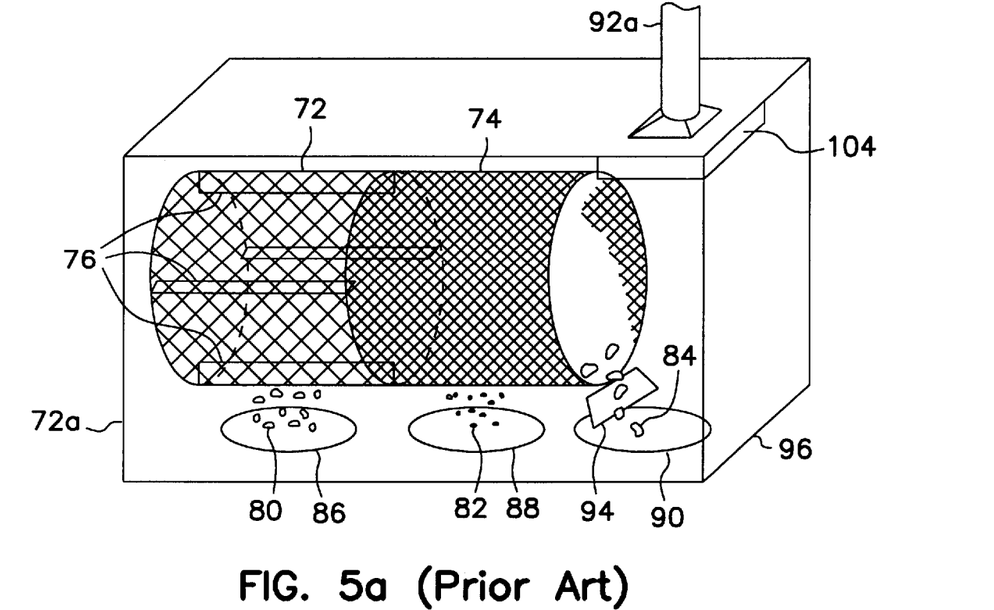
FIG. 5a shows a tummler separation section 72a of the prior art.
Figure 5B:
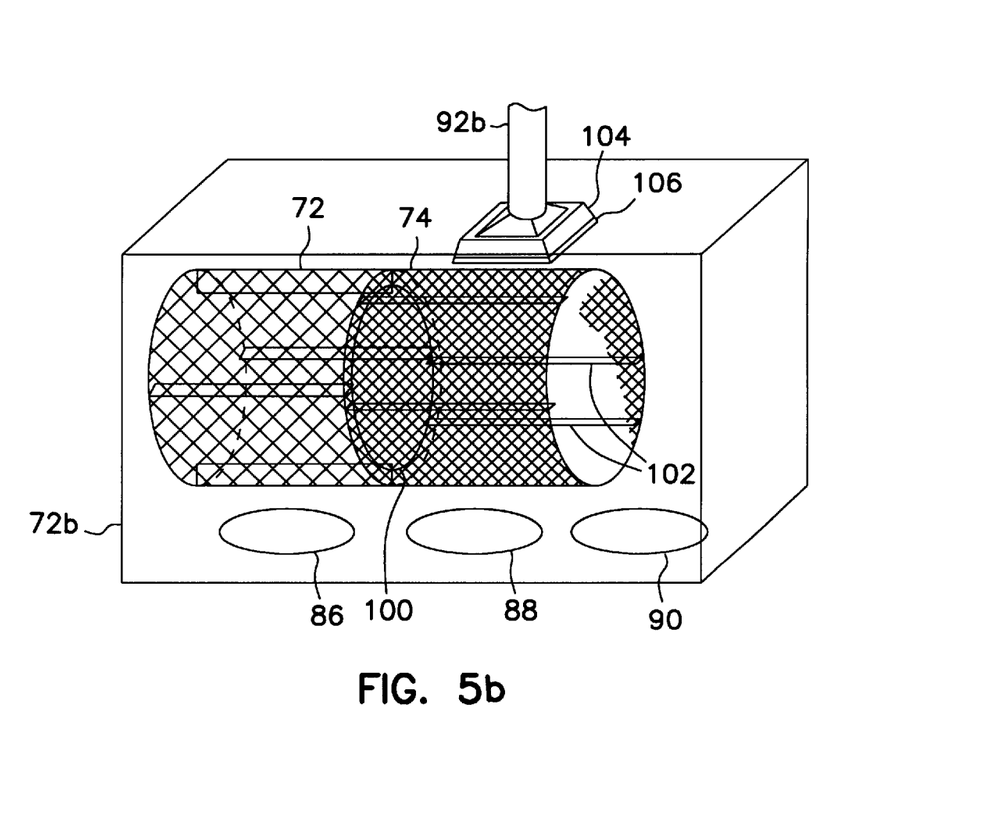
FIG. 5b show a tummler separation section 72b of the present invention.

FIGS. 4a and 4b show the first (preliminary) breaking area and the second breaking area of the prior art (4a) and a construction of the present invention (4b). In both systems, the second conveyor (4a and 4b) transport lamps 12 through breaking means 30. A beater element 30 is shown, which rotates and smashes the lamps into smaller (than the lamp) pieces 36. These pieces 36 fall between crushing or further breaking means 32, with nip rollers 32, 34 shown. The crushing or breaking means 32 reduces the pieces 36 into smaller fragments 38 by application of pressure or by grinding which creates the small fragments 38 which fall through an opening 40.

In the prior art configuration of FIG. 4a, the pieces 36 could often build up between the nip roller 34 and the conveyor means 4a and jam the equipment or be pulled backwards by the returning conveyor surface 2a and not fall into the hole 40. This would provide a mechanism for either further contamination of the work environment, damage to the equipment, or both. An improvement possibility which can be incorporated into the system of the present invention is plates 50 and 52 which catch material 38 which does not fall directly from nip rollers 32 and 34 into the hole 40 and directs those pieces 38 towards hole 40. The plate 50 nearer the conveying means 4b is preferably closer to nip roll 34 than the other plate 52 is to nip roll 32 (e.g., 10–16 inches between 34 and 50 and 10–24 inches between 32 and 52).

The smaller fragments 38 fall onto a third conveying means 54 and are carried on conveyor surface 56. Small ridges 58 are present on the conveyor surface to help prevent the fragments 38 from moving backwards when or if the angle of movement of the conveyor surface 56 is uphill, as is the preferred direction of movement at this point in the apparatus and process. The ridges 58 are preferably simple, quadrangular cross section strips (square, rectangular, trapezoidal, paralellapipedal, or truncated pyramidal) of from about 1/8 to 2 inches in height, more preferably between 1/4 and 1 inch in height (and should extend all the way across the conveying surface even though this is not illustrated in the figure). This conveyor means 54 (preferably, as with the other conveyor means 2a, 2b, 4a and 4b) is a conveyor belt, preferably roller driven rather than belt driven. It carries the fragments 38 to the next particle processing, size controlling or breaking areas represented in FIG. 5b. The prior art version of this third breaking area system 70a comprises a first screen 72 having four flat vanes 76 to move and tumble fragments 38 (not shown) to further break them down in size and to separate particles. The first screen 72 has relatively small openings or mesh (e.g., less than 1/10 to 1/4 inch) to allow the small fragments 80 to pass through he first screen 72 and fall through hole 86 to be kept in a first separate container (not shown). This first set of large particles 80 comprises the powder (e.g., calcium phosphate) with mercury). A second filter element 74 with somewhat larger mesh or openings is in direct conveying conduction connection with the first screen 72. Larger particles (not shown) which have been unable to pass through the mesh or filter openings with the size of filters 72 are again tumbled in second filter area 74. This further reduces the size of fragments so that the particles 82 can pass through the larger mesh size (e.g., less than 1/2 to 1 inch) of the second filter element 74 and pass into the second collection hole 88 into a second containing element (not shown). These particles 82 may include glass remnants. Larger pieces 84 which have not been broken down by the previous process exit the second filter 74 and fall into a third containing opening 90. A plate 94 may be used to direct these larger pieces which primarily contain metal end caps (not shown), wires (not shown), plastic pieces (not shown) and/or other elements or materials which have not or can not be broken down in the previous processing. It is important to note that vent 92a was placed at the extreme end of the unit 70a in the prior art construction. This vent 92a is the opening through which negative pressure is applied over the entire processing system to reduce vapor and particulate emissions to the environment. A significant advantage found in the practice of the present invention was that moving the vent 92b in FIG. 5b to a zone so that the center of the vent is located at least one eighth (preferably at least one quarter) of the distance away from the most distal end 96 of the tummler unit 70b (or more easily measurable, at least one eighth or at least one quarter of the distance away from the end of the second filter element, based upon the length of the second filter element 74 or the combined length of both filter elements 72 and 74), reduces the amount of mercury carried out with larger pieces 84. It is believed, in retrospect, that the air flow through vent 92a of about 600 cubic feet per minute, helped to carry powder with associated mercury along with the larger pieces 84. By simply shifting the vent 92b so that its center is at least 1/4 of the distance of the length of the tummies section 72b (or to 1/4 of the combined length of filter unit 72 and 74, or the individual length of second filter element 74) away from the distal end with respect to the movement of material through the system (which move from left to right in the figures), the amount of mercury deposited through containing openings 90 was reduced by at least 40%. That simple modification in FIG. 5b accomplished a tremendous advantage in the present invention system. The air flow through vent 92b could then be increased to 900 to 1600 cubic feet per minute (preferably 1,000 to 2,000 cfm) to further reduce any leakage along the system, and with the vent 92b location in a more proximal position (closer to the point of entry of the waste materails, e.g., second portion) within the tummler zone 70b, mercury emissions to collecting opening 90 were still reduced by 40% over the system shown in FIG. 4a.

These screens and filter means within the tummler section of the separation apparatus of the present invention are also referred to as mass conduction connected filter elements because they conduct the mass (the broken second portions, for example) and they are filter elements. They conduct the mass because of the inate forces created by the repeated or continuous influx of mass (second portion) into the tummler area, and the progressive forces which drive the mass from the proximal (entry) side of the tummler section (nearest the second conveyor means and the second size reduction means) towards the distal (exit) side of the tummler section. These forces are merely the resuly of more mass entering the tummler section and pressing the mass towards the distal end of the tummler section. The air flow of the negative pressure over the system, a tilt in the frame (e.g., downward), a screw element relationship of the blades and ridges within the filter elements may also act to assist in the movement of this mass towards the distal end of the tummler section.

Another advantage in the tummler zone 70b was the use of a ring lip 100 between the first screen 72 and the second screen 74 to keep the powder material (not shown) within the zone of operation of screen 72 longer and to prevent materials which have passed from screen 72 to screen 74 and been further diminished in size from slipping back to screen 72 easily. Single filter element(s) 104 or dual filter elements 104 and 106 may be located between the rotation filter elements 72 and 74 and the vent 92b.

The term mass conduction-connected filter elements is used in the description of the present invention to describe a component(s) of the apparatus which combines the functions of transporting the mass (e.g., the third portion)nad allows the mass to pass through open areas (e.g., filter holes or mesh) as the mass is conducted through that component. The mass may be additionally reduced in size by the movement through this component (e.g., as shown by the action of the rotating filter).

The location of the vent is one important aspect which can add to the present invention. The location of the vent may be on the most proximal end of the third size reduction means frame (entering horizontally or from a vertical location, within the first one-quarter of the frame covering the third size reduction means, within the second or third one-quarter of the frame (e.g., in the approximate center), or in the last one quarter as long as the main path of the air draw does not pull air through the open end exit area of the second filter element. This requires, approximately a location of the center of the vent at a point at least one eighth of the distance back along the length of the two filter elements. Preferably it is at least one-quarter of that distance, and most preferably at least one quarter to three-quarters of that distance.

What is claimed:

1. An apparatus for separating materials from breakable elements comprising:

a first conveyor for conveying at least one solid breakable element to a first size reducing means which applies force to said solid breakable element sufficient to break said solid breakable element into a first portion, a second size reducing means for applying force to said first portion to form smaller second portions, said second size reducing means being capable of reducing the size of at least some of said first portion, a second conveyor located to receive at least some of said smaller second portions, said second conveyor conveying said some of said second portions to a third size reducing means, said third size reducing means comprising at least two filter elements having interior and exterior surfaces, a first of said at least two filter elements having first open areas which pass from its interior surface to its exterior surface which are smaller than second open areas which pass from the interior surface to the exterior surface of said second filter element, a frame which covers at least said first, second and third size reducing means, and a gas withdrawing means which withdraws gas from within said frame through a vent, said at least two filter elements defining a longitudinal dimension which comprises the combined length from a first end of said first filter where said second portion is introduced into said third size reducing means to a second end where a third portion exits said third size reducing means, said third portion comprising material which has not passed through said first open area or said second open area from said interior surface to said exterior surface in either said first filter element or said second filter element exits, and said third portion exits said second filter element, said vent having its center at least one eighth of the distance from said second end to said first end, away from said second end towards said first end.

2. The apparatus of claim 1 wherein said conveyor for conveying a fluorescent lamp to a first size reducing means comprises two distinct conveyors with a gap between them, and within said gap is a solid element which at least partially decreases the open area within said gap.

3. An apparatus for separating materials from lamps comprising a conveyor for conveying at least one fluorescent lamp to a first size reducing means which applies force to said at least one lamp sufficient to break said at least one lamp to form a first portion, after said first size reducing means, a second size reducing means for applying force to said first portion, said second size reducing means being capable of reducing the size of at least some of said first portion into a second portion, a second conveyor located to receive at least some of said second portion, said second conveyor conveying said second portion to a third size reducing means, said third size reducing means comprising at least two mass conduction-connected filter elements having interior and exterior surfaces, a first of said at least two mass conduction-connected filter elements having open areas which pass from its interior surface to its exterior surface which are smaller than open areas which pass from the interior surface to the exterior surface of said second mass conducting filter element, said second portion being moved in a direction by said first and second mass conduction-connected filter elements so that said second portion contacts said first mass conducting filter element before it contacts said second mass conducting filter element, a frame which covers at least said first, second and third size reducing means, and a vent which withdraws gas from within said frame, said at least two mass conduction-connected filter elements defining a longitudinal dimension which comprises the length from a first end of said first mass conduction-connected filter where said second portions are introduced into said third size reducing means and conveyed to a second end where a third portion comprising material which has not passed through open areas from said interior surface to said exterior surface in either said first and second mass conducting filter element exits said second mass conducting filter element, said vent having its center within said frame where it covers said third size reducing means at least one eighth of the longitudinal dimension away from said second end towards said first end.

4. The apparatus of claim 3 wherein said conveyor for conveying a fluorescent lamp to a first size reducing means comprises two distinct conveyors with a gap between them, and within said gap is a solid element which at least partially decreases the open area within said gap.

5. The apparatus of claim 4 wherein a portion of a first of said two distinct conveyors is located outside of said frame so that manual contact with said first of said two distinct conveyors may be made.

6. The apparatus of claim 3 wherein said first size reducing means comprises an element which strikes said lamps.

7. The apparatus of claim 3 wherein said second size reducing means comprises a means which crushes or grinds said first portion.

8. The apparatus of claim 7 wherein said second size reducing means comprises a means which crushes or grinds said first portion.

9. The apparatus of claim 8 wherein said size reducing means comprises a pair of rollers which apply force to said first portion.

10. The apparatus of claim 9 wherein said pair of rollers are located with a space between said rollers and a delivery end of said first conveyor, and a guide extends from below said rollers to a location behind an end of said first conveyor so that any material which may fall vertically from said first conveyor will land on or beyond said guide and be guided to said second conveyor, the guide being set away from said first conveying means.

11. The apparatus of claim 9 wherein said vent withdraws air at a rate of from 1,000 to 2,000 cubic feet per minute.

12. The apparatus of claim 11 wherein said apparatus has breakable fluorescent lamps therein with mercury within said lamps, and said apparatus has at least three separate collection means within said third size reduction areas, a first collection means associated with said first mass conducting filter element which collects particulate material, the majority of which by weight is particulates associated with mercury, a second collection means associated with said second mass conducting filter element which collects particulates the majority of by weight comprises glass, and a third collection means after said at least two mass conducting filter elements which collects material comprising a majority of material which was too large to pass from the interior to exterior surfaces of said at least two mass conduction-connected filter elements.

13. The apparatus of claim 9 wherein said apparatus has breakable fluorescent lamps therein with mercury within said lamps, and said apparatus has at least three separate collection means within said third size reduction areas, a first collection means associated with said first mass conduction-connected filter element which collects particulate material the majority by weight of which is particulates associated with mercury, a second collection means associated with said second mass conduction-connected filter element which collects particulates the majority of weight of which comprises glass, and a third collection means after said at least two mass conduction-connected filter elements which collects material comprising a majority of material which was too large to pass from the interior to exterior surfaces of said at least two mass conduction-connected filter elements.

14. The apparatus of claim 3 wherein between said first and said second mass conducting filter elements, there is a continuous lip around the interior of and end of said first mass conducting filter element between said first mass conduction-connected filter element and said second mass conduction-connected filter element.

15. The apparatus of claim 14 wherein said vent withdraws air at a rate of from 1,000 to 2,000 cubic feet per minute.

16. The apparatus of claim 14 wherein said apparatus has breakable fluorescent lamps therein with mercury within said lamps, and said apparatus has at least three separate collection means within said third size reduction areas, a first collection means associated with said first mass conducting filter element which collects particulate material, the majority of which by weight is particulates associated with mercury, a second collection means associated with said second mass conducting filter element which collects particulates the majority of by weight comprises glass, and a third collection means after said at least two mass conducting filter elements which collects material comprising a majority of material which was too large to pass from the interior to exterior surfaces of said at least two mass conduction-connected filter elements.

17. The apparatus of claim 3 wherein said vent withdraws air at a rate of from 1,000 to 2,000 cubic feet per minute.

18. The apparatus of claim 3 wherein said apparatus has breakable fluorescent lamps therein with mercury within said lamps, and said apparatus has at least three separate collection means within said third size reduction areas, a first collection means associated with said first mass conducting filter element which collects particulate material, the majority of which by weight is particulates associated with mercury, a second collection means associated with said second mass conduction-connected filter element which collects particulates the majority of which comprises glass, and a third collection means after said at least two mass conduction-connected filter elements which collects material comprising a majority of material which was too large to pass from the interior to exterior surfaces of said at least two mass conduction-connected filter elements.

19. The apparatus of claim 18 wherein said third collecting means collects materials comprising metal from said lamps.

20. The apparatus of claim 3 wherein said means for conveying a fluorescent lamp to a first size reducing means comprises two distinct conveyors, a first conveyor and a second conveyor comprising a conveyor belt, said second conveyor being located nearer to said first size reducing means, said second conveyor having brushes located on both exterior sides of a surface which carries said lamps.

21. The apparatus of claim 3 wherein said means for conveying a fluorescent lamp to a first size reducing means comprises two distinct conveyors, a first conveyor and a second conveyor comprising a conveyor belt, said second conveyor being located nearer to said first size reducing means, said second conveyor having brushes located on both exterior sides of a surface which carries said lamps.

22. The apparatus of claim 3 wherein said second conveying means for conveying said second portion to said third size reducing means comprises a conveyor belt, said second conveying means having brushes located on both exterior sides of a surface which carries said second portion.

23. The apparatus of claim 3 wherein said second size reducing means comprises rollers which crush or grind said first portion.

24. The apparatus of claim 23 wherein said pair of rollers are located with a space between said rollers and a delivery end of said first conveyor, and a guide extends from below said rollers to a location behind an end of said first conveyor so that any material which may fall vertically from said first conveyor will land on or beyond said guiding means and be guided to said second conveyor, the guide being set away from said first conveyor so that individual elements or pieces of said second portion do not become lodged within the space by which the guide is set away from said first conveyor.

25. The apparatus of claim 24 wherein said means which causes gas from within said frame to be withdrawn through a vent withdraws air at a rate of from 1,000 to 2,000 cubic feet per minute.

26. The apparatus of claim 3 wherein between said first and said second mass conduction-connected filter elements, there is a continuous lip around the interior of and end of said first mass conduction-connected filter element between said first mass conduction-connected filter element and said second mass conduction-connected filter element.

27. A process for physically separating component materials from a lamp without chemical treatment comprising conveying a fluorescent lamp to a first size reducing means and applying force to said lamps sufficient to break said lamps to form a first portion, then conveying said first portion to a second size reducing means and applying force to said first portion, thereby reducing the size of at least some of said first portion to a second portion, then conveying at least some of said second portion to a third size reducing means, said third size reducing means tumbling said second portion within at least two connected filter elements having interior and exterior surfaces with holes passing between said interior and exterior surfaces and said at least two connected filter elements defining a length between a proximal position where said second portion enters said at least two filter elements and a distal portion where a residue of said second portion exits said at least two filter elements, said tumbling done within a frame which covers at least said first, second and third size reducing means, withdrawing gas from within said frame through a vent, said withdrawing of gas from said vent being done at a point along the length wherein the center of the vent withdraws gas at least one eighth of the distance away from said distal end towards said proximal end.

28. An apparatus for separating materials from lamps comprising a conveyor system for fluorescent lamps to a first element which applies breaking force to any fluorescent lamps conveyed to said first element to form a first portion, after said first element and below said first element, a second element which can crush or grind said first portion to reduce the size of at least some of said first portion into a second portion, a second conveyor located to receive at least some of said second portion, said second conveyor conveying said second portion to a third element comprising at least two mass conduction-connected filter elements having interior and exterior surfaces, said second portion being closer to said second conveyor than a second of said at least two mass conduction-connected filter elements, the first of said at least two mass conduction-connected filter elements having open areas which pass from its interior to its exterior surface which are smaller than open areas which pass from the interior to the exterior surface of said second mass conducting filter element, a frame which covers at least said first, second and third size reducing means, and a means which causes gas from within said frame to be withdrawn through a vent, said at least two mass conduction-connected filter elements defining a longitudinal dimension which comprises the length from a first end of said first mass conduction-connected filter where said second portions are introduced into said third size reducing means to a second end where a third portion comprising material which has not passed through open areas from said interior surface to said exterior surface in either said first and second mass conduction-connected filter element exits said second mass conduction-connected filter element through an opening in an end of said second mass conduction-connected filter element, said vent having its center within said frame where it covers said third size reducing means at least one eighth of the distance away from said second end towards said first end.

29. The apparatus of claim 28 wherein said means for conveying a fluorescent lamp to a first size reducing means comprises two distinct conveying means with a gap between them, and within said gap is a solid element which at least partially decreases the open area within said gap.

30. The apparatus of claim 29 wherein said means for conveying a fluorescent lamp to a first size reducing means comprises two distinct conveying means with a gap between them, and within said gap is a solid element which at least partially decreases the open area within said gap.

31. The apparatus of claim 30 wherein a portion of a first of said two distinct conveying means is located outside of said frame so that manual contact with said first of said two distinct conveying means may be made.

32. The apparatus of claim 29 wherein said first size reducing means comprises an element which strikes said lamps.

33. The apparatus of claim 32 wherein said second size reducing means comprises rollers which crush or grind said first portion.

* * * * *